United States Patent
Blair

(10) Patent No.: US 8,074,316 B2
(45) Date of Patent: Dec. 13, 2011

(54) SINGLE USE FIBER OPTIC CONNECTOR END FACE CLEANING DEVICE

(75) Inventor: Paul M. Blair, Jonesboro, GA (US)

(73) Assignee: Illinois Tool Works Inc., Glenview, IL (US)

( * ) Notice: Subject to any disclaimer, the term of this patent is extended or adjusted under 35 U.S.C. 154(b) by 957 days.

(21) Appl. No.: 11/873,672

(22) Filed: Oct. 17, 2007

(65) Prior Publication Data

US 2009/0100623 A1    Apr. 23, 2009

(51) Int. Cl.
*A47L 13/02* (2006.01)
*A47L 13/17* (2006.01)
*A47L 25/00* (2006.01)
*A61M 35/00* (2006.01)

(52) U.S. Cl. ..... 15/104.94; 15/118; 15/209.1; 15/210.1; 206/361; 206/362; 604/1

(58) Field of Classification Search ........... 15/208, 15/209.1, 210.1, 118, 105, 104.93, 104.94, 15/225, 223, 224; 206/361, 362; 604/1
See application file for complete search history.

(56) References Cited

U.S. PATENT DOCUMENTS

| | | | |
|---|---|---|---|
| 579,850 A | 3/1897 | Uhlmann | |
| 1,848,859 A | 3/1932 | Wishart | |
| 1,857,145 A * | 5/1932 | Funk | 604/1 |
| 2,490,636 A * | 12/1949 | Klein | 15/214 |
| 2,585,061 A | 2/1952 | Webster, Jr. | |
| 2,788,537 A * | 4/1957 | Greenberg | 401/10 |
| 2,880,442 A | 4/1959 | Shelby | |
| 2,908,923 A * | 10/1959 | Schlechter | 401/10 |
| 3,352,307 A * | 11/1967 | Bloxham | 604/1 |
| 3,532,529 A * | 10/1970 | Hiroshi et al. | 427/246 |
| 3,613,146 A | 10/1971 | Oviatt | |
| 3,690,911 A * | 9/1972 | Endo et al. | 427/464 |
| 4,101,026 A | 7/1978 | Bonk | |
| 4,152,803 A | 5/1979 | Gersin et al. | |
| 4,171,047 A | 10/1979 | Doyle et al. | |
| 4,306,687 A | 12/1981 | Hadtke | |
| 4,333,979 A | 6/1982 | Sciaraffa et al. | |
| 4,741,944 A | 5/1988 | Jackson et al. | |

(Continued)

FOREIGN PATENT DOCUMENTS

| | | |
|---|---|---|
| AU | 527032 | 10/1983 |
| GB | 2285915 | 8/1995 |
| TW | 382992 | 8/2001 |

(Continued)

OTHER PUBLICATIONS

International Search Report for PCT/US2008/078939 dated Jan. 15, 2009.

(Continued)

*Primary Examiner* — Gary Graham
(74) *Attorney, Agent, or Firm* — Levenfeld Pearlstein, LLC

(57) ABSTRACT

A wet to dry, single use fiber optic connector end face cleaning device. The device is comprised a of a first swab, the first swab having a cleaning head and a first grasping end, the cleaning head having a presaturated fabric attached thereto, and a second swab, the second swab having a drying head and a second grasping end, the drying head having a drying fabric attached thereto. In use, the cleaning head of the first swab is positioned adjacent to the drying head of the second swab, the cleaning head and the drying head at different elevations. Also disclosed is a method for using the fiber optic connector end face cleaning device.

20 Claims, 2 Drawing Sheets

U.S. PATENT DOCUMENTS

| | | | |
|---|---|---|---|
| 4,873,728 A | | 10/1989 | Bono |
| 4,887,994 A * | | 12/1989 | Bedford .......................... 604/1 |
| 5,212,847 A * | | 5/1993 | Melcher et al. .............. 15/244.1 |
| 5,220,703 A | | 6/1993 | Kanayama et al. |
| 5,461,747 A | | 10/1995 | Clausen |
| 5,605,749 A | | 2/1997 | Pike et al. |
| 5,656,361 A | | 8/1997 | Vogt et al. |
| 5,874,160 A | | 2/1999 | Keck |
| 6,098,239 A | | 8/2000 | Vosbikian |
| 6,167,584 B1 | | 1/2001 | Nassiri |
| 6,629,329 B1 * | | 10/2003 | Webb et al. .................. 15/209.1 |
| 6,865,770 B2 | | 3/2005 | Forrest |
| 2002/0088073 A1 * | | 7/2002 | Kammerer et al. .......... 15/209.1 |
| 2003/0098045 A1 | | 5/2003 | Loder |
| 2003/0203180 A1 | | 10/2003 | Touringny |
| 2005/0090836 A1 * | | 4/2005 | Stracener ...................... 606/119 |
| 2005/0215157 A1 * | | 9/2005 | Dugan et al. .................. 442/411 |
| 2005/0267395 A1 * | | 12/2005 | Mangold et al. .................. 604/1 |

FOREIGN PATENT DOCUMENTS

| | | |
|---|---|---|
| WO | WO 98/03713 | 1/1998 |
| WO | WO 00/56201 | 9/2000 |

OTHER PUBLICATIONS

"A More Effective Means of Cleaning Fiber Optic Connections in Outside Plant, FTTH and OEM Applications", Ed Forrest, ITW Chemtronics, provided website link is www.chemtronics.com/pdf/upload/A%20More%20Effective%20Means %20of%20Cleaning%20-%20White%20Paper-3%20rev.pdf.

"Fiber Optic Cleaning—Fiber Connector Cleaner", Fiber Optics for Sale Co., Complete Supply Solutions, information regarding fiber optic cleaning and fiber connector cleaners, provided website link is www.fiberoptics4sale.com/Merchant2/fiber-optic-cleaning.php.

"The Combination Cleaning Process (CCp TM)" information regarding the combination cleaning process of ITW Chemtronics, provided website link is http://www.chemtronics.com/pdf/upload/The%20Combination%20Cleaning%20Process.pdf.

"Fiber Optic Connectors" by Force, Inc., 2005, Information regarding parts, installation and cleaning and handling of fiber optic connectors, provided website link is www.fiber-optics.info/articles/connector-care.htm.

"Inspection and Cleaning Procedures for Fiber-Optic Connections" Document ID 51834, Updated Sep. 26, 2006, Cisco Systems, 1992-2006, provided website link is http://www.cisco.com/warp/public/127/cleanfiber2.html.

"Fiber Optic Cleaning Practices", Avici Systems, Inc., 2006, provided website link is avici.com/documentation/PDFDocs/06698-00_revAA.pdf.

* cited by examiner

SINGLE USE FIBER OPTIC CONNECTOR END FACE CLEANING DEVICE

BACKGROUND OF THE INVENTION

The present invention is directed to a swab for cleaning. More particularly, the present invention pertains to a single use, fiber optic connector end face cleaning device.

Swabs are used in all manners of cleaning. For example, every one will recognize common cotton tipped swabs that are used for person hygiene and care. Because of the compact and effective nature of these swabs, they have been adopted for use in numerous areas of technology and manufacture. One such area is the cleaning and maintenance of fiber optic devices.

Within the past several decades, fiber optic lines have transformed the telecommunications industries and have made the Internet possible to millions. Fiber optics lowers costs and allows for faster transmissions times over long distances over traditional methods of communication. Fiber optics also plays a significant role in a variety of other applications, including aerospace, navigation and military applications. The great advantage of fiber-optic cable is that it does not suffer the same signal losses as other signal transfer modalities, eliminating the need for amplification processes. With the advent of standardized fiber optic connectors, fiber optic technology is being used more than ever in increasingly more industries. Thus, concern over proper cleaning and maintenance of fiber optic components has also increased.

During manufacture and use of fiber optic components, it is not unusual for pieces of manufacturing debris, such as dust and fibers or other particulate debris to be left on surface of the components. It is also not unusual for light oils, such as fingerprint and natural skin oils, gels or other lubricants to be found oil many of these parts. The debris and oils, however, can significantly degrade, distort or prevent the proper and precise transmission of images.

Of particular importance is the fiber optic connector component and its end face. The fiber optic connector end face must be absolutely clean before it is inserted into a transmitter or receiver. Upwards of seventy, percent (70%) of signal transmission problems are caused by soiled connectors. Fiber optic connector cores are relatively small; single mode fibers have cores that are narrower than a human hair so that even the smallest amount of dust, lint, oil or other foreign particle compromises the integrity of the signal being sent over the fiber. A single dust particle as small as a micrometer landing on the core of a single-mode fiber can cause significant signal loss. In addition, foreign particles can cause air gaps or misalignments between the cores of mating surfaces, resulting in significant attenuation or back-reflection. Larger dust particles can completely cloud the core of a single-mode fiber, resulting in signal degradation and eventually signal loss if the dirt and oils are not removed regularly.

Thus, clean fiber optic connections are vital for maintaining error-free signal transmission in optical systems. It is essential that fiber optic connectors are cleaned ever time they are mated and unmated.

Conventional methods of cleaning, such as compressed air or dipping in alcohol are not sufficient in removing substances left by connector end caps and other contaminants, and using twist and turn or figure-eight cleaning motions can damage the connector by grinding any dust or grit that may be present into the end face, resulting in the need for field replacement or repolishing.

Dry cleaning may be moderately effective if the soil is a light particle. However, dry cleaning a dusty connection in an environment where grit is present can scratch a connector end face. Wet cleaning provides a measure of cleaning safety to a dusty connection, but over saturation causes solvent entrapment and contamination in the connector. As the excess solvent evaporates, it can become trapped in the connection and promote moisture condensation. Misuse or overuse of cleaning products can not only result in signal degradations, but can also damage the optical fiber end face polish.

Other methods involve a wetting and driving system of cleaning, a two step process wherein the connector end face is wetted with a cleaning fluid, or a wipe is saturated with cleaning fluid and then wiped dry with a cloth fabric. However, by the time the soiled solvent is removed (wiped dry), the solvent has had time to evaporate, leaving behind the soil. The soil is re-deposited onto the connector end face, leaving residue and watermarks. In addition, current wet-to-dry systems are large and intended for multiple use, rather than single use, thus, forcing the user to store contaminated cleaning devices.

Accordingly, there is a need for a fiber optic connector end face cleaning device and method of using same that can be used for cleaning sensitive components and surfaces and is portable, compact, convenient, and disposable. Desirably, such a device leaves little to no residue from the device within the component or on the surface and does not damage the connector end face by grinding, over-saturating, or allowing soil to redeposit on the end face.

BRIEF SUMMARY OF THE INVENTION

The present invention pertains to a wet to dry, single use fiber optic connector end face cleaning device comprised of a first swab and a second swab. The first swab has a cleaning head and a first grasping end. The cleaning head has a fabric attached which is wet. The second swab has a drying head and a second grasping end. The drying head has a drying fabric attached thereto. The first and second grasping ends are formed having a rectangular cross-section.

When used, the cleaning head is positioned adjacent to the drying head, with the head and the drying head at different heights. The cleaning head of the first swab is wetted with a cleaning solvent; the solvent can be water, an ester, an alcohol, an aliphatic hydrocarbon or a combination. The material attached to the cleaning and drying heads of the first and second swabs is a thick synthetic suede microfiber.

The first swab and the second swab are packaged in hermetically-sealed foil or foil-like packaging, called a dual pouch, having separate first and second pouches. The first swab is packaged in the first pouch and the second swab is packaged in the second pouch. The fabric attached to the cleaning head has a width about equal to a width of the swab. The grasping end is formed from a polymeric material, and can include a static dissipative constituent.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein.

DETAILED DESCRIPTION OF THE INVENTION

Figure 1:
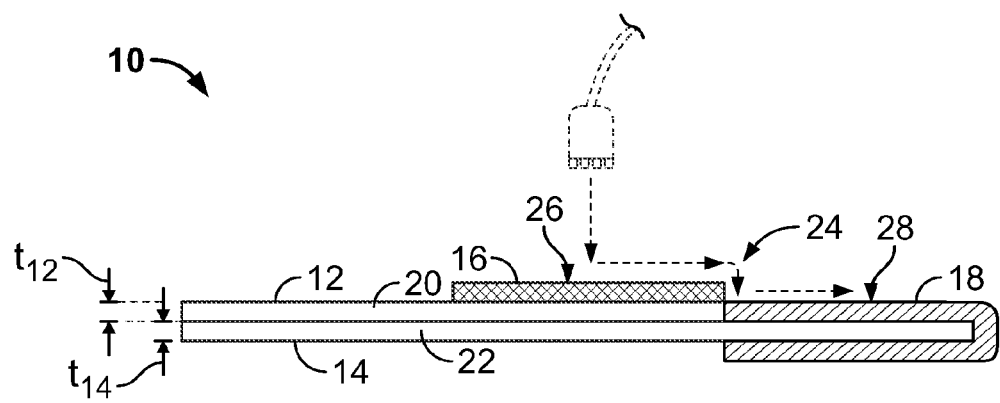
FIG. 1 is a side view of a face cleaning device embodying the principles of the present invention.
Figure 2:
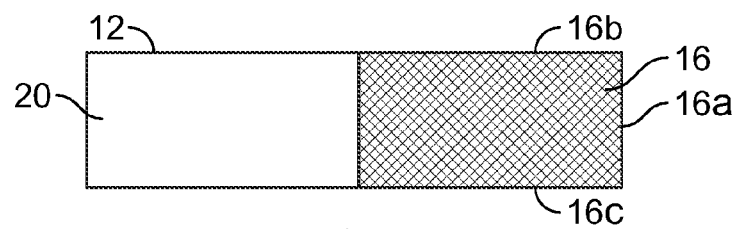
FIG. 2 is a plan view of the top swab of the present cleaning device.
Figure 3:
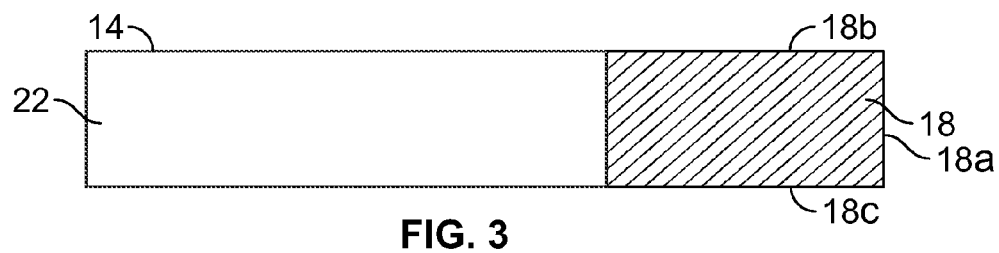
FIG. 3 is a plan view of the bottom swab of the present cleaning device.
Figure 4:
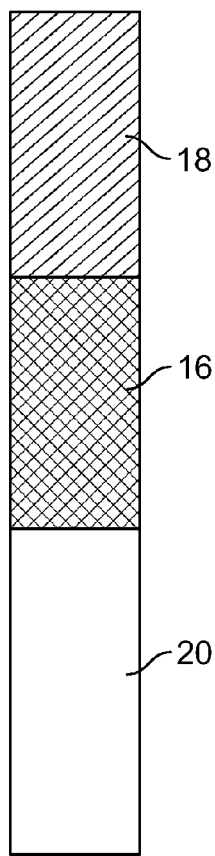
FIG. 4 is a plan view of the top swab and bottom swab together.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

It should be further understood that the title of this section of this specification, namely, "Detailed Description Of The Invention", relates to a requirement of the United States Patent Office, and does not imply, nor should be inferred to limit the subject matter disclosed herein.

The present invention pertains to a wet-to-dry, swab device and method for cleaning fiber optic connector end faces. The wet-to-dry device is comprised of a pre-saturated, wet swab and a dry swab used in tandem. Solvent is applied and removed from the connector end face in one continuous motion by wiping the end face on the pre-saturated swab, over a step, and onto the dry swab to dry the connector end face.

Referring now to the figures and in particular to FIG. 1, where an embodiment of the present invention is shown, the fiber optic connector end face cleaning device 10 is composed of two separate, flat, elongated members or tab-like swabs, 12, 14 with heads 26, 28 at one end of each swab 12, 14, with the opposing ends used as handles 20, 22.

The head 26 of the first swab 12 has a fabric 16 covering the head 26. The width of the fabric 16 is about the width of the swab 12, the fabric 16 extending to the edges 16a, 16b and 16c of the first swab 12. The fabric 16 of the first swab 12 is presaturated with a cleaning solution. The fabric 16 is an absorbent, lint free fabric with an affinity for the cleaning solvent and is also of sufficient basis weight and strength so that it possesses pad-like or cushioning properties. The fabric/material 16 should prevent over-saturating the fiber optic connection which can cause signal distortion. In the present embodiment, the fabric 16 used is a synthetic ultra suede micro-fiber, approximately 1 mm thick, but may also be formed from other suitable materials such as a non-woven material, such as synthetic chamois of polyurethane or polyvinyl acetate material.

The head 28 of the second swab 14 has a fabric 18 covering the head 28. The width of the fabric 18 is about the width of the swab 14 and extends to the edges 18a, 18b, and 18c of the second swab 14, over the edge 18a and along an opposite side of the second swab 14. The second swab's fabric 18 remains unwetted, to dry the connector end face, and is an absorbent, lint free fabric with an affinity for the cleaning solvent. The fabric 19 is also of sufficient basis weight and strength so that it possesses pad-like or cushioning properties. In the present embodiment, the fabric 18 is a synthetic ultra suede microfiber, approximately 1 mm thick, but may also be formed from other suitable materials such as a non-woven material, such as synthetic chamois of polyurethane or poly vinyl acetate material.

A variety of solvents are contemplated to saturate swab 12, including alcohol, water, ketones, esters, aliphatic hydrocarbons or various blends of these solvents. In one swab, the cleaning solution is a blend of isopropyl alcohol, ethyl alcohol, and a medium-evaporating-rate aliphatic hydrocarbon, such as Isopar E commercially available from ExxonMobil Corporation.

The handle 20, 22 can be formed from a static dissipative material or may have a static dissipative constituent. The swab handle 20, 22 is a plastic or polymer material, but may also be wood.

Figure 6:
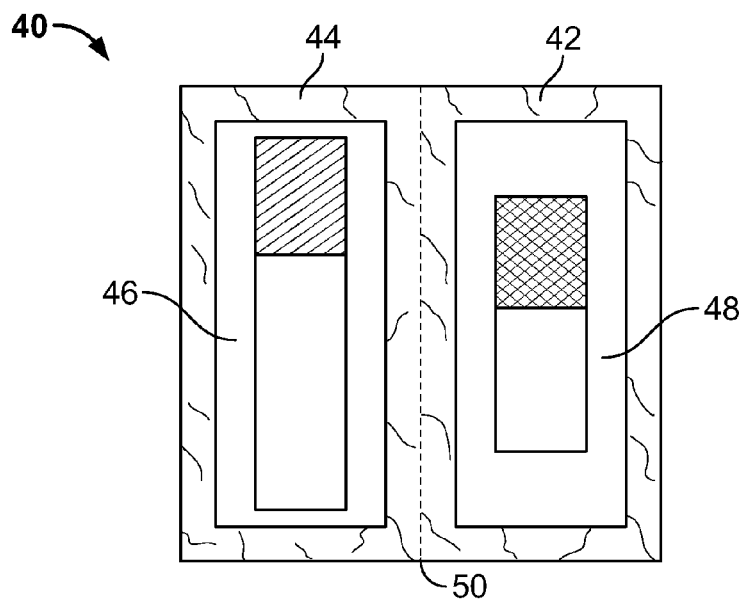
FIG. 6 is a plan view of an embodiment of the dual pouch packaging system.

Packaging of the single use cleaning device is also novel. FIG. 6 slows an embodiment of the dual pouch packaging. The dual pouch 40, always ensures that the two swabs 12, 14 are available, one wet and one dry because each swab 12, 14 is individually packaged in hermetically sealed, foil or foil-like laminate pouches that are attached together. The dual pouch 40 is partitioned into two sections, 42, 44, in which the wetted swab 12 may be packaged in a first pouch 46 of the dual pouch 40 and the dry swab 16 can be packaged in a second pouch 48 of the dual pouch 40. The two pouches 46, 48 are separated from each other by partition 50, such that the wetted swab 12 does not wet or otherwise come into contact with the dry swab 14. It is also contemplated, however, that the swabs 12, 14 may be packaged together in the same pouch, both of them dry, and after removal from the packaging, it is contemplated that the swab 12 is saturated with a suitable cleaning solution from an external source.

When used, each swab 12, 14 is removed from its pouch. The dry swab 14 is placed on a flat surface with the fabric 18 facing up with the head 28 oriented toward the user The wet swab 12 is aligned atop the dry swab 14 with the head 26 also oriented toward the user. The fabric end 16 of the wet swab 12 should slide up to abut the fabric 18 of the bottom, dry swab 14. The thickness of the wet and dry swab handles $t_{12}$, $t_{14}$, are about 1 mm-2 mm and thus, acts as a step between the two fabric heads 26, 28.

Figure 5:
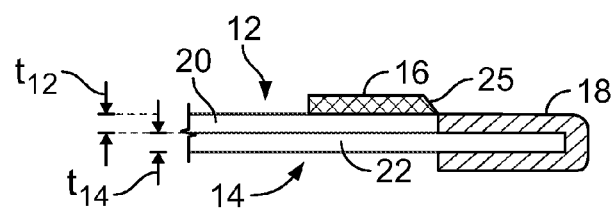
FIG. 5 is an enlarged side view of an embodiment of the present cleaning device.

While varying lengths of the first and second swabs are contemplated, in a present embodiment, the first swab 12, is shorter than the second swab 14 so first swab 12 nay rest completely on the longer second swab 14. The edge 16a of the shorter swab 12 does not have any fabric 16 covering the edge, and the fabric 16 on the top surface of first swab 12 may be cut at 90 degrees or more, as shown in FIG. 5 at 25, to prevent the moisture from the first swab 12 from contacting the fabric 18 of the head 28 of the longer, dry swab 14. The fabric 16 of the shorter swab 12 is saturated in the cleaning solution. The longer swab 14 is packaged dry.

The swabs 12, 14, now properly oriented, are held in place on the smooth work surface with one hand while a fiber optic end face is placed on the wetted swab head 26 of the shorter swab 12 and drawn toward the dry swab head 28, over the step 24, 25 between the swab heads 26, 28 and onto the fabric 18 of the dry swab head 28 of the longer swab 14 in one continuous, unidirectional motion. In this manner, the connector C end face F employs a wet to dry cleaning method on cleaning fiber optic end faces, known as Combination Cleaning. The step 24, 25 keeps one swab 12 saturated and the other swab 14 dry and the thick synthetic suede microfiber acts as both a highly absorbent wiping material and soft cushion to allow the wiping fabric 16, 18 to conform to the fiber optic end face.

Previous cleaning devices are larger and intended for multiple end face cleaning events and rely on a separate solvent delivery device. This present device, however, is more portable and can be supplied to the end user with a fiber optic network component device. This is a convenient one time use and disposable device, and integrates the wiping material with cushioning material. Other devices employ separate cushioning and wiping material.

In addition to the dual swab use described above, the wet swab 12 may be used as a flat, saturated surface in conjunction with an appropriate dry wipe. The day wipe could be non-woven polyester cellulose blend fabric, non-woven melt blown polypropylene fabric or a knitted or woven microfiber fabric. The wipe would need the properties of (1) absorbency to draw soiled solvent from the fiber optic end face, (2) inherent cleanliness to not contribute contamination (especially non-limiting) (3) softness not to scratch the end face and (4) cushioning to permit the wipe surface to conform to the end face. Instead of a single wipe, the dry wipe man be used in a stack of single sheets to provide the necessary cushioning and absorbency. Other configurations of dry wipe that are appropriate for use with the wet swab 12 is within the contemplation, spirit, and scope of this invention.

The swab 12 is saturated with a cleaning solvent. The swab 12 may be saturated from an external source, but it is contemplated that the swab 12 is packaged, with the cleaning solvent applied to the fabric 16, in a chemical resistant package (foil) 40 which will contain the solvents and keep them ready for use. The wet swab 12 is removed from the wet swab pouch 46 of the dual pouch 40 and placed on the dry wipe, which is resting on a fat surface. The swab 12 would be oriented with the swab head 26 toward the user and the handle 20 farther from the user. The swab is then held in place with finger or thumb on the dry wipe while positioning the fiber optic connector end face on the wet swab head, perpendicular to the surface. The fiber end face is then drawn across the wet swab head, off the step and onto the dry portion of the wipe three times with light pressure. A novel feature of the swabs 12 is the paddle-like construction which provides a flat pre-saturated surface on which a fiber optic end face may be wiped up to three times. The construction is unique in providing a step to separate the wet swab head from the dry wipe. The construction is also unique in that the swabs are sufficiently wide, in relation to their height, so that stacking one on another is a suitable configuration.

All patents referred to herein, are hereby incorporated herein by reference, weather or not specifically done so within the text of this disclosure In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the tire spirit and scope of the novel concepts of the present invention. It is to be understood that no limitation with respect to the specific embodiments illustrated is intended or should be inferred. The disclosure is intended to the appended claims all such modifications as fall within the scope of the claims.

What is claimed is:

1. A single use fiber optic connector end face cleaning device comprising:
   a first swab, the first swab having a first handle, the first handle having first and second sides and defining a longitudinal axis and including a cleaning head and a first grasping end, the cleaning head having a cleaning material attached thereto to the first side, the second side being devoid of cleaning material;
   a second swab, the second swab having a second handle having first and second sides, the second handle defining a longitudinal axis and including a drying head and a second grasping end, the drying head having a drying material attached thereto to the first side, wherein the first swab is positioned on the second swab with the second side of the first handle disposed on the first side of the second handle such that the cleaning head is positioned adjacent to the drying head, and such that a surface of the cleaning head is at a greater distance from the second swab handle than a surface of the drying head to define a step therebetween.

2. The cleaning device in accordance with claim 1 wherein the first handle is formed having a rectangular cross-section.

3. The cleaning device in accordance with claim 1 wherein the second handle is formed having a rectangular cross-section.

4. The cleaning device in accordance with claim 1 wherein the first swab cleaning head is pre-saturated with a cleaning solution.

5. The cleaning device in accordance with claim 1 wherein the material of the cleaning head of the first swab is wetted with a cleaning solvent after removal from a packaging.

6. The cleaning device in accordance with claim 1 wherein the first swab and the second swab can be separated in a packaging.

7. The cleaning device in accordance with claim 1 wherein the first swab and the second swab can be packaged together.

8. The cleaning device in accordance with claim 1 wherein the cleaning material is a thick, cushioning material.

9. The cleaning device in accordance with claim 8 wherein the thick cushioning material is a synthetic suede microfiber.

10. The cleaning device in accordance with claim 1 wherein the drying material is a thick cushioning material.

11. The cleaning device in accordance with claim 10 wherein the thick cushioning material is a synthetic suede microfiber.

12. The cleaning device in accordance with claim 1 wherein the first swab and the second swab can be packaged in hermetically-sealed foil packaging.

13. The cleaning device in accordance with claim 12 wherein the packaging is a dual pouch having a first pouch and a second pouch.

14. The cleaning device in accordance with claim 13 wherein the first swab can be packaged in the first pouch and the second swab can be packaged in the second pouch.

15. The cleaning device in accordance with claim 1 wherein the cleaning material has a width about equal to a width of the handle.

16. The cleaning device in accordance with claim 1 wherein the handle is formed from a polymeric material.

17. The cleaning device in accordance with claim 16 wherein the polymeric material includes a static dissipative constituent.

18. A wet to dry, single use fiber optic connector end face cleaning device comprising:
   a first swab, the first swab having a first handle having first and second sides, the first handle defining a longitudinal axis and including a cleaning head and a first grasping end, the cleaning head having a cleaning material attached thereto to the first side, the second side being devoid of cleaning material;
   a second swab, the second swab having a second handle having first and second sides, the second handle defining a longitudinal axis and including a drying head and a second grasping end, the drying head having a drying material attached thereto to the first side; and a dual pouch having a first compartment and a second compartment, wherein the first swab can initially be packaged in the first compartment and the second swab can initially be packaged in the second compartment, and wherein the first swab is positioned on the second swab with the second side of the first handle disposed on the first side of the second handle such that the cleaning head is positioned adjacent to the drying head, and such that a surface of the cleaning head is at a greater distance from the second swab handle than a surface of the drying head to define a step therebetween.

19. The cleaning device in accordance with claim 18 wherein the dual pouch is a hermetically-sealed foil package.

20. The cleaning device in accordance with claim 19 wherein the dual pouch is partitioned.

\* \* \* \* \*